US012496690B2

(12) United States Patent
Lee

(10) Patent No.: US 12,496,690 B2
(45) Date of Patent: Dec. 16, 2025

(54) ENGAGING STRUCTURE FOR HAND TOOL

(71) Applicant: Chien-Ying Lee, Taichung (TW)

(72) Inventor: Chien-Ying Lee, Taichung (TW)

( * ) Notice: Subject to any disclaimer, the term of this patent is extended or adjusted under 35 U.S.C. 154(b) by 379 days.

(21) Appl. No.: 18/341,849

(22) Filed: Jun. 27, 2023

(65) Prior Publication Data

US 2025/0001563 A1 Jan. 2, 2025

(51) Int. Cl.

| | |
|---|---|
| ***B25B 23/10*** | (2006.01) |
| ***B25B 13/04*** | (2006.01) |
| ***B25B 13/06*** | (2006.01) |
| ***B25B 13/08*** | (2006.01) |
| ***B25B 13/46*** | (2006.01) |
| ***B25B 13/50*** | (2006.01) |

(52) U.S. Cl.

CPC ............ *B25B 23/105* (2013.01); *B25B 13/04* (2013.01); *B25B 13/065* (2013.01); *B25B 13/08* (2013.01); *B25B 13/462* (2013.01); *B25B 13/5033* (2013.01)

(58) Field of Classification Search

CPC ....... B25B 13/04; B25B 13/06; B25B 13/065; B25B 13/08; B25B 13/462; B25B 13/5033; B25B 23/105

See application file for complete search history.

(56) References Cited

U.S. PATENT DOCUMENTS 4,512,220 A * 4/1985 Barnhill, III .......... B25B 13/065 81/121.1
4,581,957 A * 4/1986 Dossier ................. B25B 13/065 81/121.1
4,930,378 A * 6/1990 Colvin .................. B25B 13/065 81/121.1
5,219,392 A * 6/1993 Ruzicka ................ B25B 13/065 81/124.3
5,284,073 A * 2/1994 Wright .................. B25B 13/065 81/186
5,388,486 A * 2/1995 Ruzicka .................. B25B 13/04 81/124.3
7,661,339 B2 * 2/2010 Wu ......................... B25B 27/18 81/186
8,056,448 B2 * 11/2011 Chen ................... B25B 23/0028 81/186
9,718,170 B2 * 8/2017 Eggert .................. B25B 13/065
11,759,918 B2 * 9/2023 Kukucka ............... B25B 13/065 81/121.1
11,806,843 B2 * 11/2023 Eggert .................. B25B 13/065

(Continued)

*Primary Examiner* — David B. Thomas

(74) *Attorney, Agent, or Firm* — LANWAY IPR SERVICES; Chun-Ming Shih

(57) ABSTRACT

An engaging structure for a hand tool includes a main body provided with a mounting element, six drive portions, six receiving portions, two first arcuate faces, a second arcuate face, a first radius, a second radius, a first distance, and a second distance. Each of the six receiving portions has an arcuate concave shape and is arranged between one of the two first arcuate faces of one of the six drive portions and one of the two first arcuate faces of another one of the six drive portions. Each of the six receiving portions forms a first circle and a third radius. The mounting element has a center forming a second circle forming a first hexagon having six sides. The center is served as an axis defining a second hexagon. The second hexagon is less than the first hexagon.

7 Claims, 12 Drawing Sheets

(56) References Cited

U.S. PATENT DOCUMENTS

| | | | | |
|---|---|---|---|---|
| 11,897,099 | B2 * | 2/2024 | Kukucka | B25B 27/18 |
| 2007/0125204 | A1 | 6/2007 | Lin | |
| 2020/0353606 | A1 * | 11/2020 | Kukucka | B25B 13/08 |
| 2021/0146506 | A1 * | 5/2021 | Kukucka | B25B 13/04 |
| 2024/0100656 | A1 * | 3/2024 | Chen | B25B 13/463 |

* cited by examiner

ENGAGING STRUCTURE FOR HAND TOOL

BACKGROUND OF THE INVENTION

Field of the Invention

The present invention relates to a hand tool and, more particularly, to an engaging structure for a hand tool.

Description of the Related Art

A conventional socket structure was disclosed in the U.S. Publication No. 2007/0125204, and comprises a socket 20 having an engaging hole 22, six grooves 23, and six stops ribs 24.

However, such a conventional socket structure has the following disadvantages.

1. When the stops ribs 24 protrude in the engaging hole 22 to an extent, the socket 20 needs to have a determined thickness to keep the rotation force, so that the outer diameter of the socket 20 is increased due to projection of the stops ribs 24.

2. Each of the stops ribs 24 has a sharp pointed shape so that the rotation torque is not large enough. Thus, the screw head 40 is easily worn out or chamfered by the stops ribs 24 during a period of time.

3. When the socket 20 is used to rotate the screw head 40, the stops ribs 24 engage the screw head 40 successively and easily cause a serration on the screw head 40.

BRIEF SUMMARY OF THE INVENTION

In accordance with the present invention, there is provided an engaging structure for a hand tool, comprising a main body. The main body is provided with a mounting element. The mounting element includes six drive portions, six receiving portions, two first arcuate faces, a second arcuate face, a first radius, a second radius, a first distance, and a second distance. Each of the six receiving portions has an arcuate concave shape. Each of the six receiving portions is arranged between one of the two first arcuate faces of one of the six drive portions and one of the two first arcuate faces of another one of the six drive portions. Each of the six receiving portions forms a first circle and a third radius. The mounting element has a center. The center forms a second circle. The second circle forms a first hexagon having six sides. The center is provided with a vertical line. The center is served as an axis defining a second hexagon. The second hexagon is less than the first hexagon. Each of the six angled corners is situated at a center of the first circle of one of the six receiving portions.

According to the primary advantages of the present invention, the second arcuate face slightly protrudes from each of the two first arcuate faces, so that the first distance is defined between the second arcuate face and each of the two first arcuate faces. The mounting element is provided with the six receiving portions. Each of the six receiving portions has the first circle which is not tangent to each of the two first arcuate faces. The second arcuate face is convex slightly, and each of the six receiving portions is concave slightly. Thus, the mounting element will not wear the six corners of the screw member easily by provision of the second arcuate face and each of the six receiving portions. The first distance is less than 0.5 mm so that the outer diameter of the main body is slightly increased by provision of the second arcuate face. Thus, the outer diameter of the main body and the mounting element will not wear the six corners of the screw member. In addition, each of the six angled corners of the second hexagon is situated at a center of the first circle of one of the six receiving portions so that the six circular corners of the star-shaped screw member are received in the six receiving portions respectively. Thus, the mounting element of the main body is used to drive the star-shaped screw member exactly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
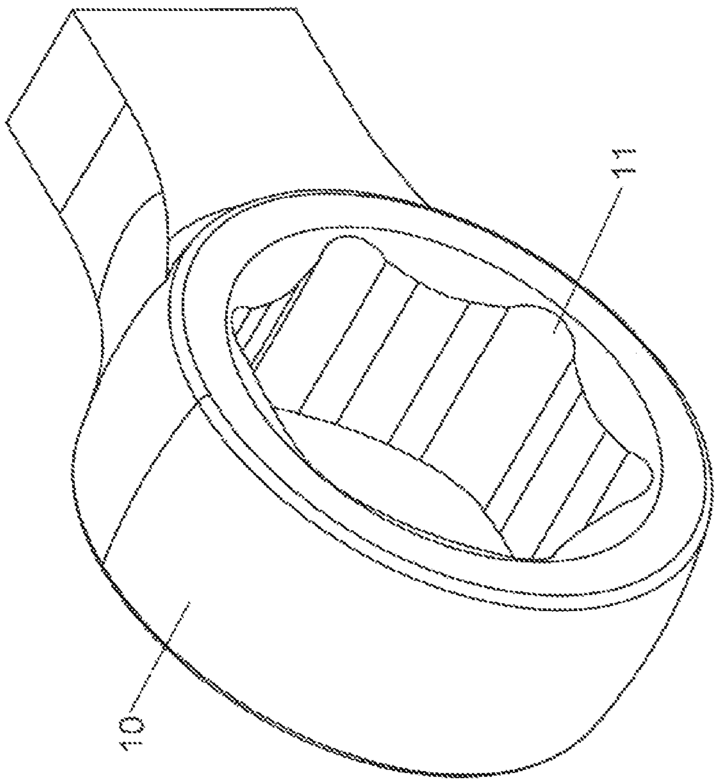
FIG. 1 is a perspective view of an engaging structure for a hand tool in accordance with the first preferred embodiment of the present invention.
Figure 2:
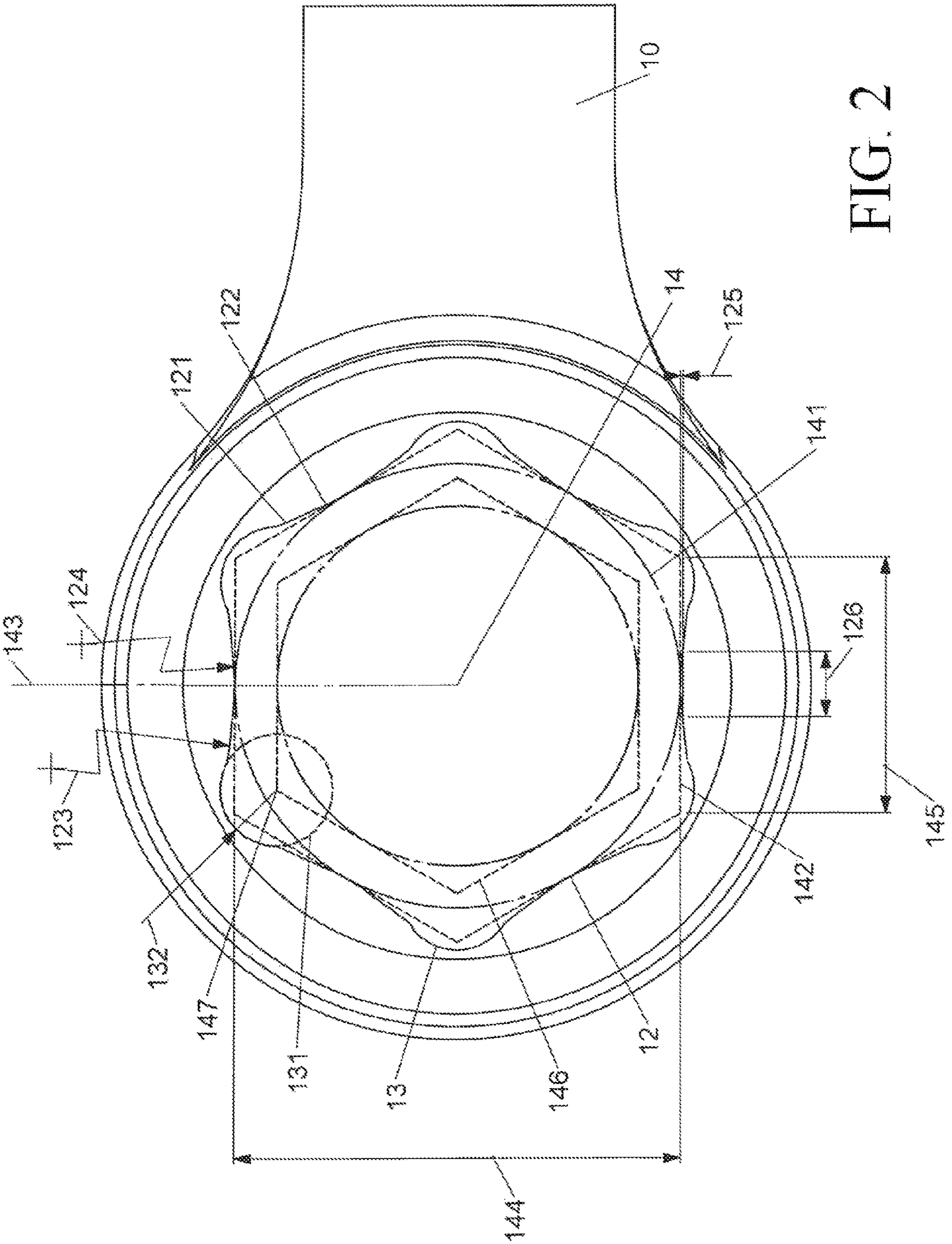
FIG. 2 is a front view of the engaging structure for a hand tool in accordance with the preferred embodiment of the present invention.

Referring to the drawings and initially to FIGS. 1 and 2, an engaging structure (or an operating structure or a driving structure) for a hand tool in accordance with the preferred embodiment of the present invention comprises a main body 10. The main body 10 is provided with a mounting element 11. The mounting element 11 includes six drive portions 12 and six receiving portions 13. The six drive portions 12 and the six receiving portions 13 are arranged alternately and annularly. The main body 10 is a box end wrench or an engaging member of a hand tool.

Each of the six drive portions 12 has an arcuate convex shape. Each of the six drive portions 12 includes two first arcuate faces 121 and a second arcuate face 122. The second arcuate face 122 is situated at a center of each of the six drive portions 12. The second arcuate face 122 is located between the two first arcuate faces 121. The second arcuate face 122 is more projected than each of the two first arcuate faces 121. The two first arcuate faces 121 are spaced by the second arcuate face 122.

Each of the two first arcuate faces 121 has a first radius 123. The second arcuate face 122 has a second radius 124. The first radius 123 is more than the second radius 124. The ratio between the first radius 123 and the second radius 124 is more than three (3:1) or more than two (2:1). Each of the two first arcuate faces 121 is tangent to a first horizontal line. The second arcuate face 122 is tangent to a second horizontal line. A first distance 125 is defined between the first horizontal line and the second horizontal line. The first distance 125 is less than 0.7 mm or 0.6 mm or 0.5 mm. A second distance 126 is defined between two ends of the second arcuate face 122.

Each of the six receiving portions 13 has an arcuate concave shape. Each of the six receiving portions 13 is arranged between one of the two first arcuate faces 121 of one of the six drive portions 12 and one of the two first arcuate faces 121 of another one of the six drive portions 12. Each of the six receiving portions 13 forms a first circle 131. The first circle 131 is not tangent to each of the two first arcuate faces 121. The first circle 131 has a third radius 132. The third radius 132 is less than the first radius 123. The third radius 132 is less than the second radius 124. Each of the six receiving portions 13 is a single arc.

The mounting element 11 has a center 14. The center 14 forms a second circle 141. The second circle 141 forms a first hexagon 142 having six sides. The second arcuate face 122 of each of the six drive portions 12 is tangent to one of the six sides of the first hexagon 142 of the second circle 141. The center 14 is provided with a vertical line 143. The vertical line 143 passes through the most protruding position of the second arcuate face 122. The vertical line 143 passes through a center of each of the two first arcuate faces 121 and a center of the second arcuate face 122.

A third distance 144 is defined between any two opposite sides of the first hexagon 142. Each of the six sides of the first hexagon 142 has a length defining a fourth distance 145. The fourth distance 145 is three times to five times of the second distance 126. The fourth distance 145 is optimally 3.7 times to 4.3 times of the second distance 126.

The center 14 is served as an axis defining a second hexagon 146. The second hexagon 146 is less than the first hexagon 142. The second hexagon 146 has six sides parallel with the six sides of the first hexagon 142. The second hexagon 146 has six angled corners 147. Each of the six angled corners 147 is situated at a center of the first circle 131 of one of the six receiving portions 13. Each of the six angled corners 147 is served as a center of the third radius 132.

The six receiving portions 13, the second hexagon 146, and the angled corners 147 are similar to a star-shaped structure disclosed in the U.S. Pat. No. 3,584,667.

Figure 3:
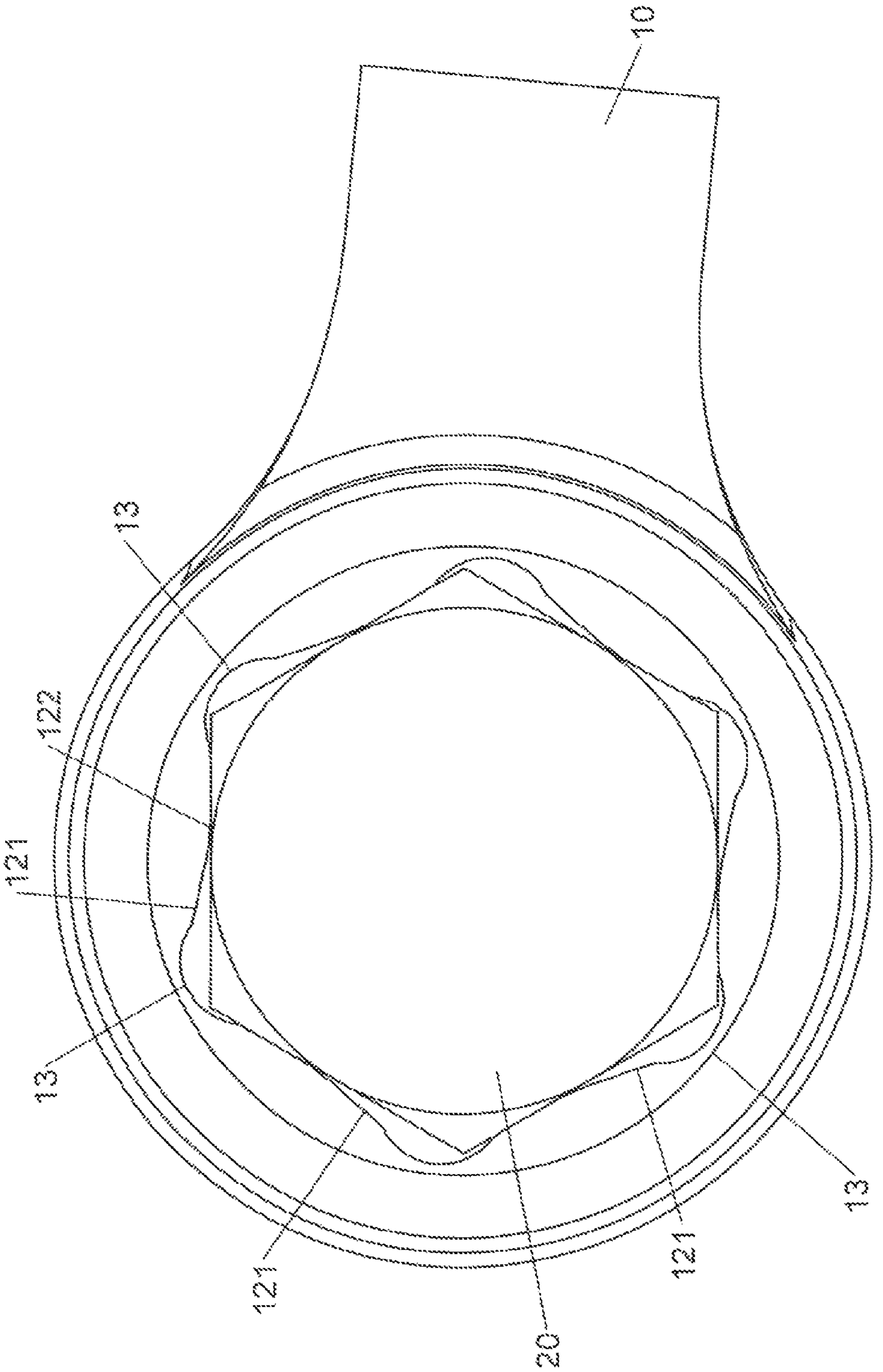
FIG. 3 is a front view of a first operation state of the engaging structure for a hand tool in accordance with the preferred embodiment of the present invention.

Referring to FIG. 3 with reference to FIGS. 1 and 2, the main body 10 is used to operate and rotate a screw member 20. When the main body 10 is rotated clockwise, the second arcuate face 122 of each of the six drive portions 12 rests on each of the six sides of the screw member 20. At this time, the first distance 125 is defined between the first horizontal line and the second horizontal line (or between the second arcuate face 122 and each of the two first arcuate faces 121). Thus, when the second arcuate face 122 of each of the six drive portions 12 presses each of the six sides of the screw member 20, a spacing is defined between one of the two first arcuate faces 121 at the right side of the second arcuate face 122 and one of the six sides of the screw member 20, so that one of the two first arcuate faces 121 at the right side of the second arcuate face 122 does not rest on one of the six sides of the screw member 20, and the other one of the two first arcuate faces 121 is also spaced from one of the six sides of the screw member 20. At this time, the six corners of the screw member 20 are received in the six receiving portions 13 respectively. Thus, when the mounting element 11 drives and rotates the screw member 20 clockwise, each of the six receiving portions 13 is not tangent to each of the two first arcuate faces 121, to prevent the six corners of the screw member 20 from being worn by the six receiving portions 13.

Figure 4:
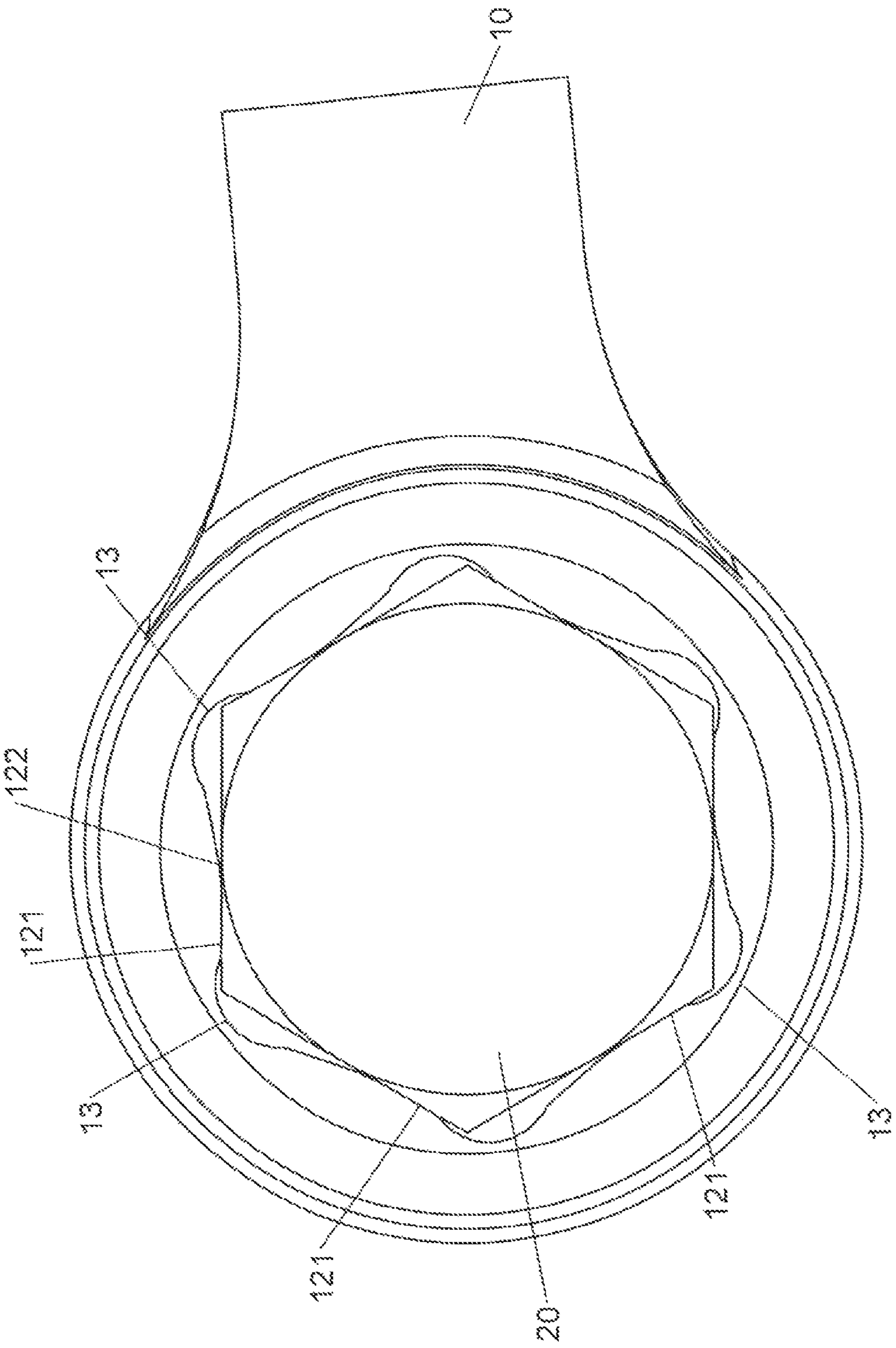
FIG. 4 is a front view of a second operation state of the engaging structure for a hand tool in accordance with the preferred embodiment of the present invention.

Referring to FIG. 4 with reference to FIGS. 1 and 2, when the main body 10 is rotated counterclockwise, the second arcuate face 122 of each of the six drive portions 12 rests on each of the six sides of the screw member 20. When the second arcuate face 122 of each of the six drive portions 12 presses each of the six sides of the screw member 20, a spacing is defined between one of the two first arcuate faces 121 at the left side of the second arcuate face 122 and one of the six sides of the screw member 20, so that one of the two first arcuate faces 121 at the left side of the second arcuate face 122 does not rest on one of the six sides of the screw member 20, and the other one of the two first arcuate faces 121 is also spaced from one of the six sides of the screw member 20. At this time, the six corners of the screw member 20 are received in the six receiving portions 13 respectively. Thus, when the mounting element 11 drives and rotates the screw member 20 counterclockwise, each of the six receiving portions 13 is not tangent to each of the two first arcuate faces 121, to prevent the six corners of the screw member 20 from being worn by the six receiving portions 13.

Figure 5:
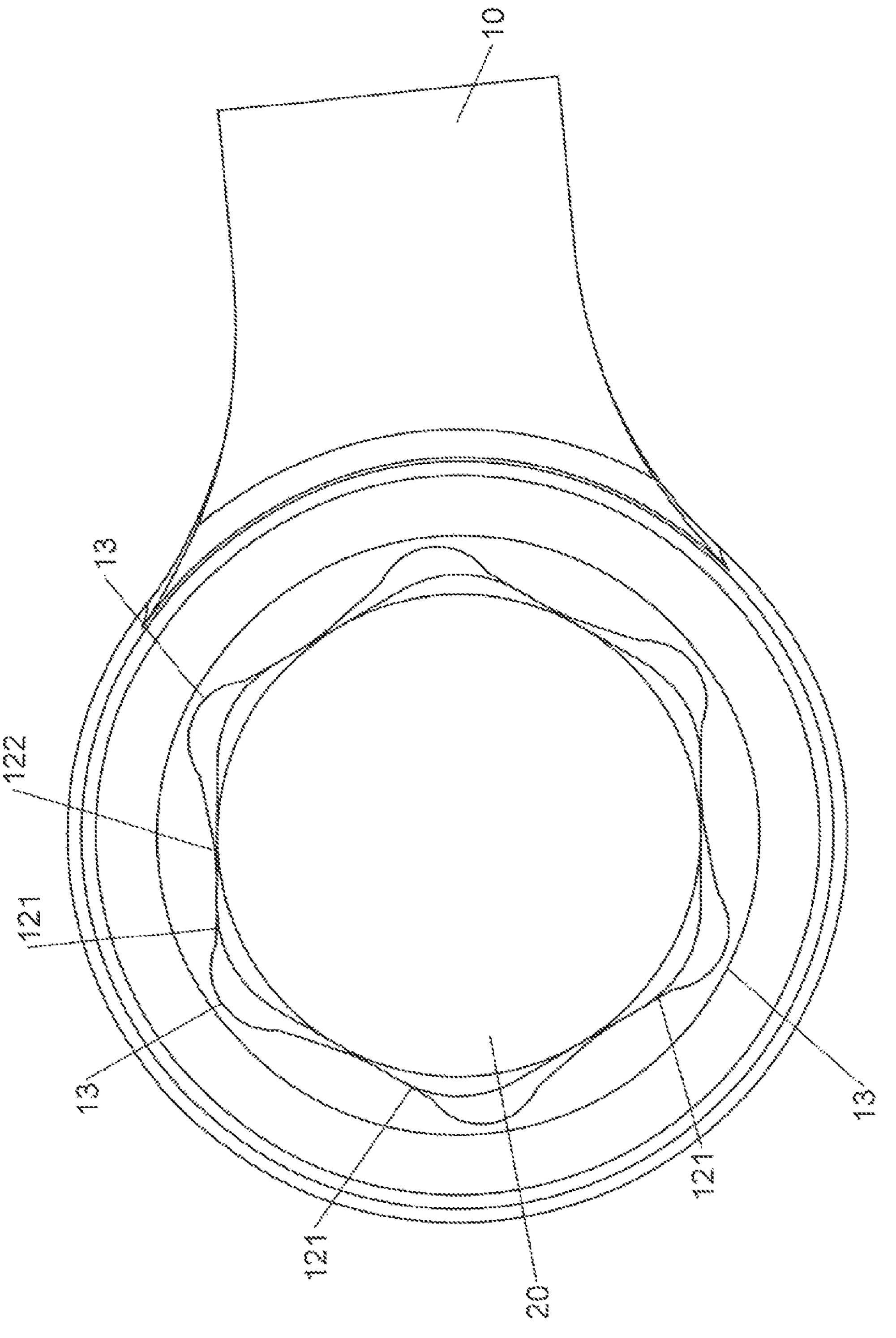
FIG. 5 is a front view of a third operation state of the engaging structure for a hand tool in accordance with the preferred embodiment of the present invention.

Referring to FIG. 5 with reference to FIGS. 1 and 2, the screw member 20 is worn out and chamfered. When the main body 10 is rotated counterclockwise to drive the screw member 20, the second arcuate face 122 of each of the six drive portions 12 still rests on each of the six sides of the screw member 20. Thus, the main body 10 is able to operate the screw member 20 even when the screw member 20 is worn out or chamfered.

Figure 6:
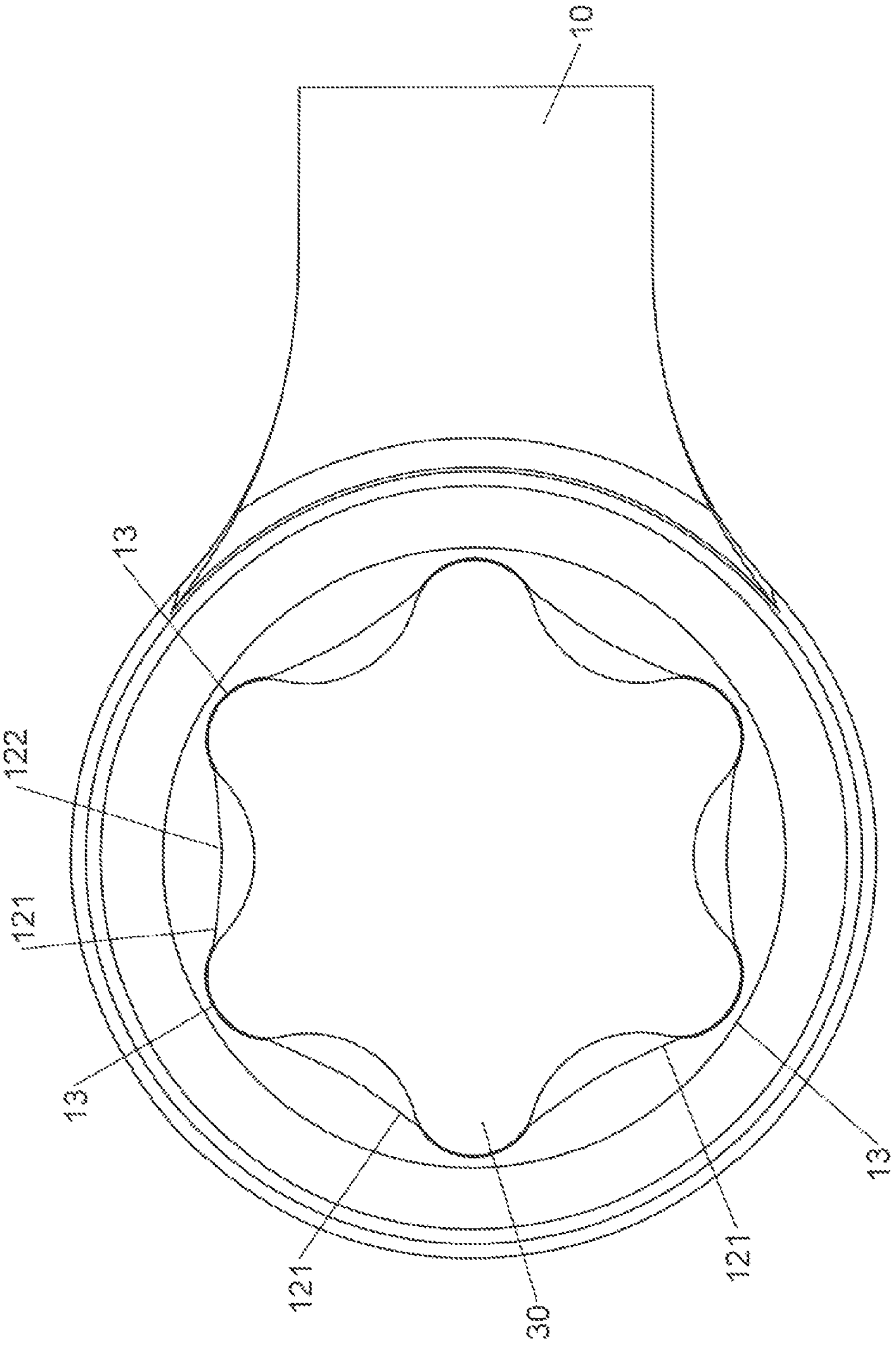
FIG. 6 is a front view showing the engaging structure is used to operate a star-shaped screw member.

Referring to FIG. 6 with reference to FIGS. 1 and 2, the main body 10 is used to drive a star-shaped screw member 30. Each of the six angled corners 147 of the second hexagon 146 is situated at a center of the first circle 131 of one of the six receiving portions 13. The star-shaped screw member 30 has six circular corners received in the six receiving portions 13 respectively. Thus, the mounting element 11 of the main body 10 is used to drive the star-shaped screw member 30 exactly.

Figure 7:
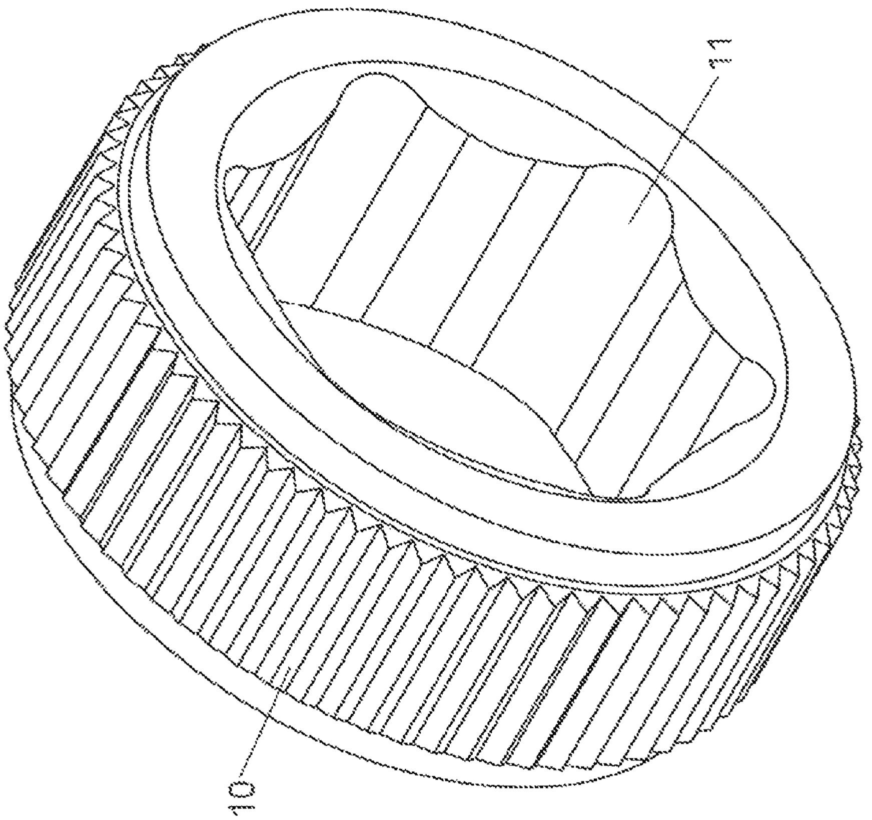
FIG. 7 is a perspective view of an engaging structure for a hand tool in accordance with the second preferred embodiment of the present invention.

Referring to FIG. 7, the main body 10 is a ratchet wheel structure pivotally mounted on a ratchet wrench.

Figure 8:
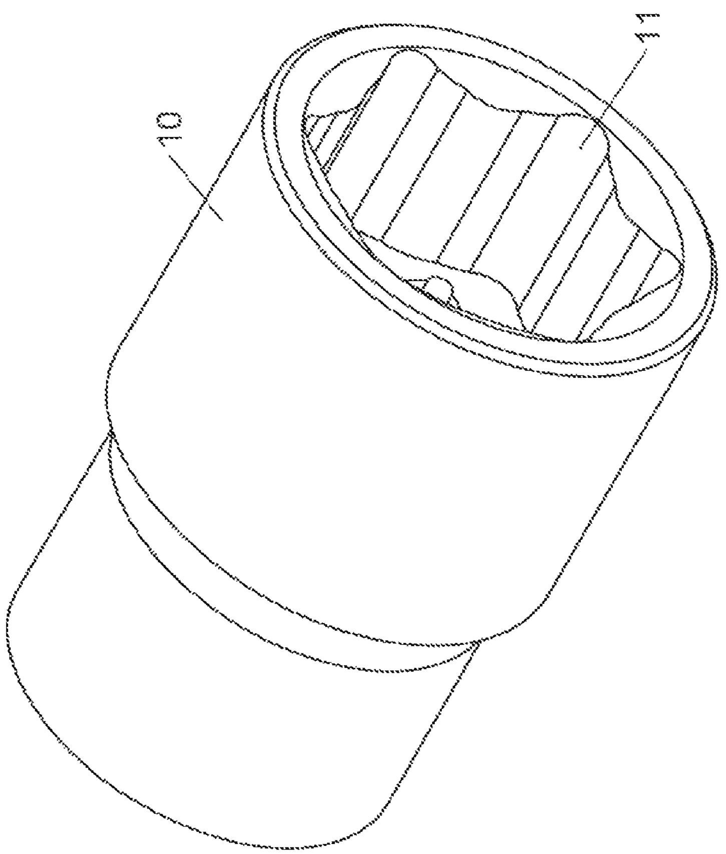
FIG. 8 is a perspective view of an engaging structure for a hand tool in accordance with the third preferred embodiment of the present invention.

Referring to FIG. 8, the main body 10 is a socket structure.

Figure 9:
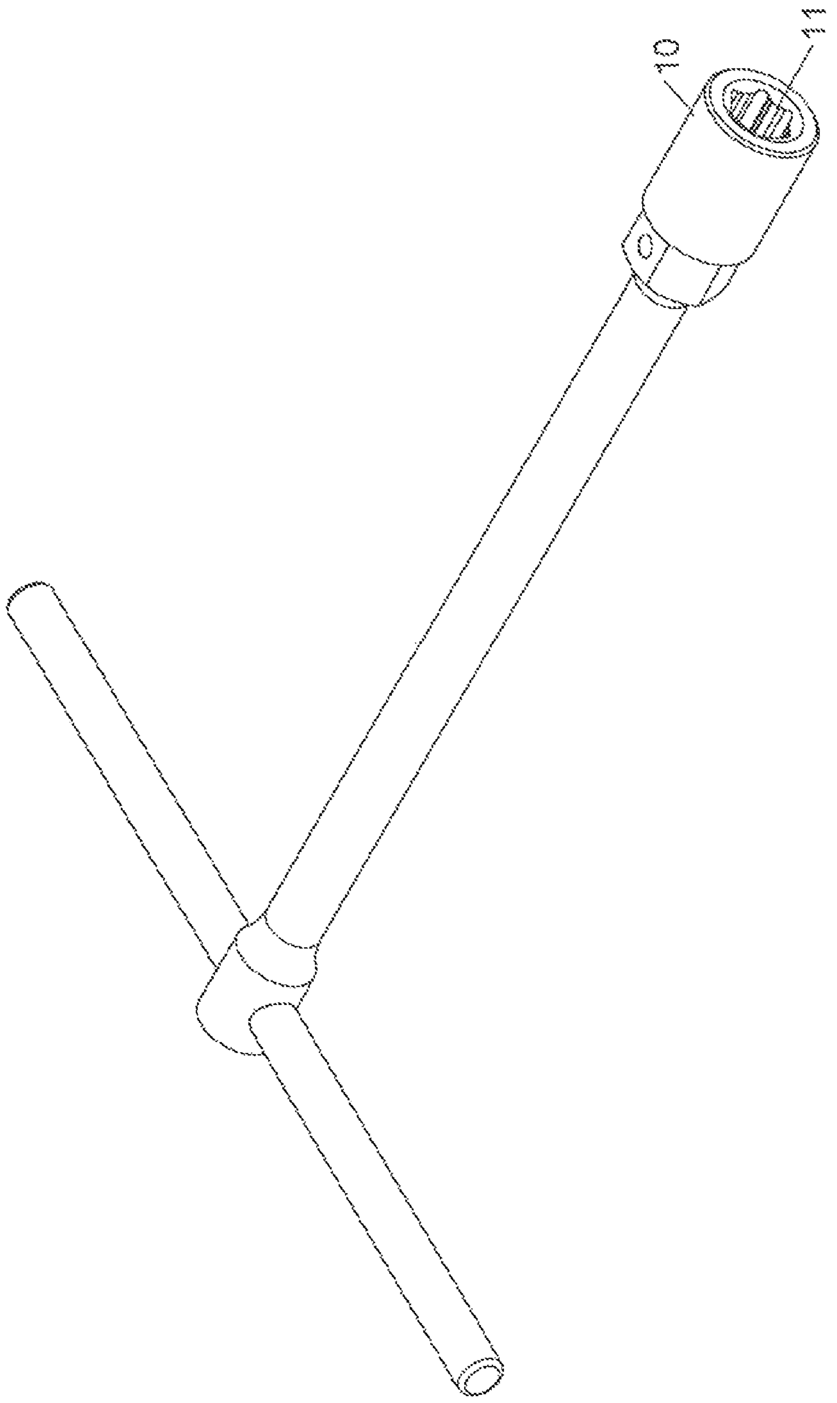
FIG. 9 is a perspective view of an engaging structure for a hand tool in accordance with the fourth preferred embodiment of the present invention.

Referring to FIG. 9, the main body 10 is a sliding rod structure.

Figure 10:
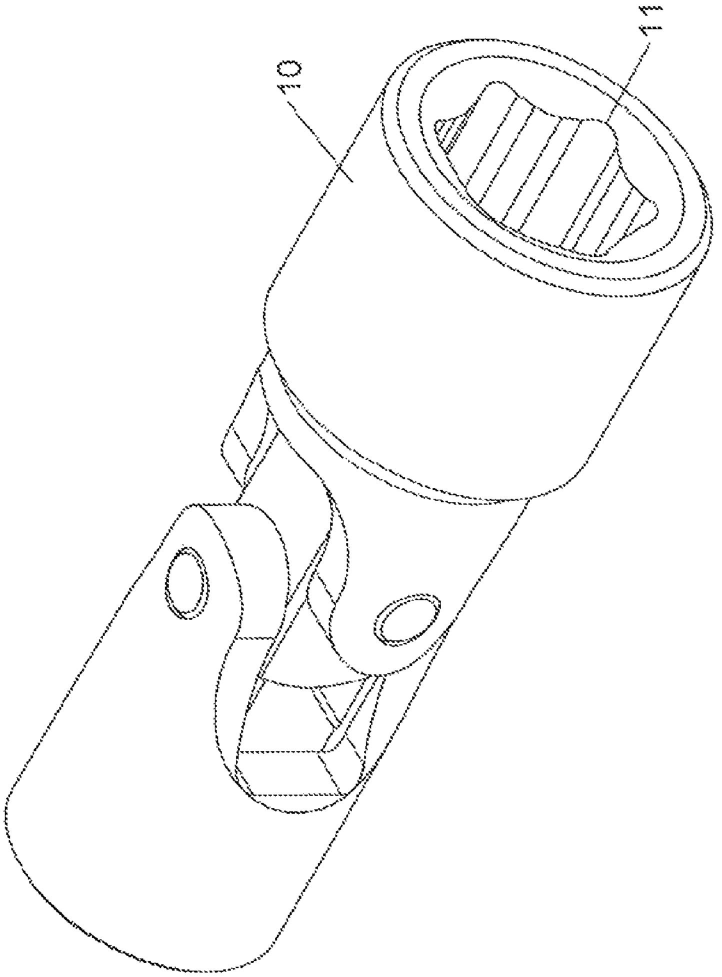
FIG. 10 is a perspective view of an engaging structure for a hand tool in accordance with the fifth preferred embodiment of the present invention.

Referring to FIG. 10, the main body 10 is a float connector or a universal connector.

Figure 11:
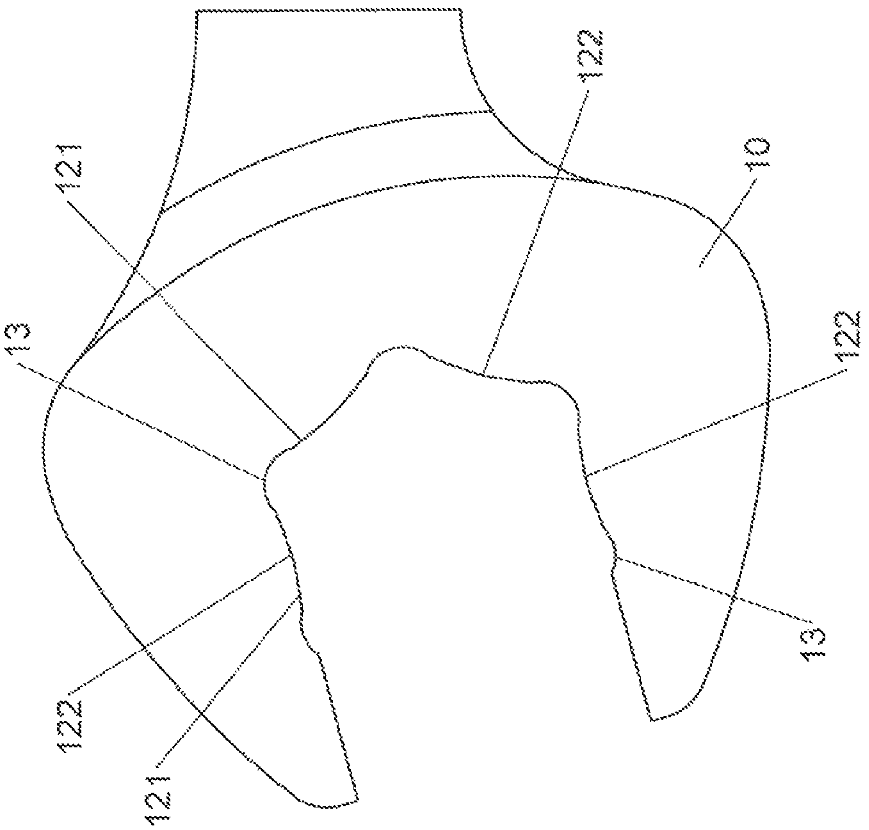
FIG. 11 is a front view of an engaging structure for a hand tool in accordance with the sixth preferred embodiment of the present invention.

Referring to FIG. 11, the main body 10 is an open end wrench structure or a pipe wrench structure.

Figure 13:
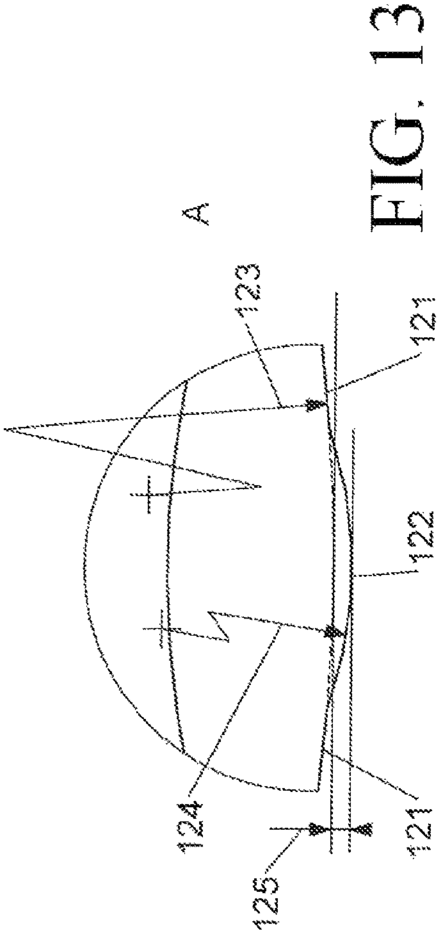
FIG. 13 is a locally enlarged view of the engaging structure for a hand tool taken along circle A as shown in FIG. 12.
Figure 14:
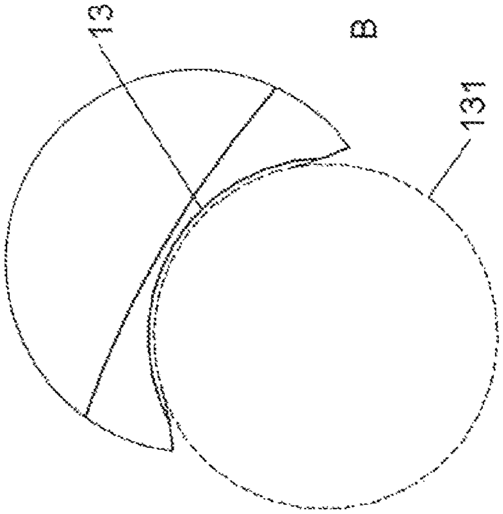
FIG. 14 is a locally enlarged view of the engaging structure for a hand tool taken along circle B as shown in FIG. 12.
Figure 12:
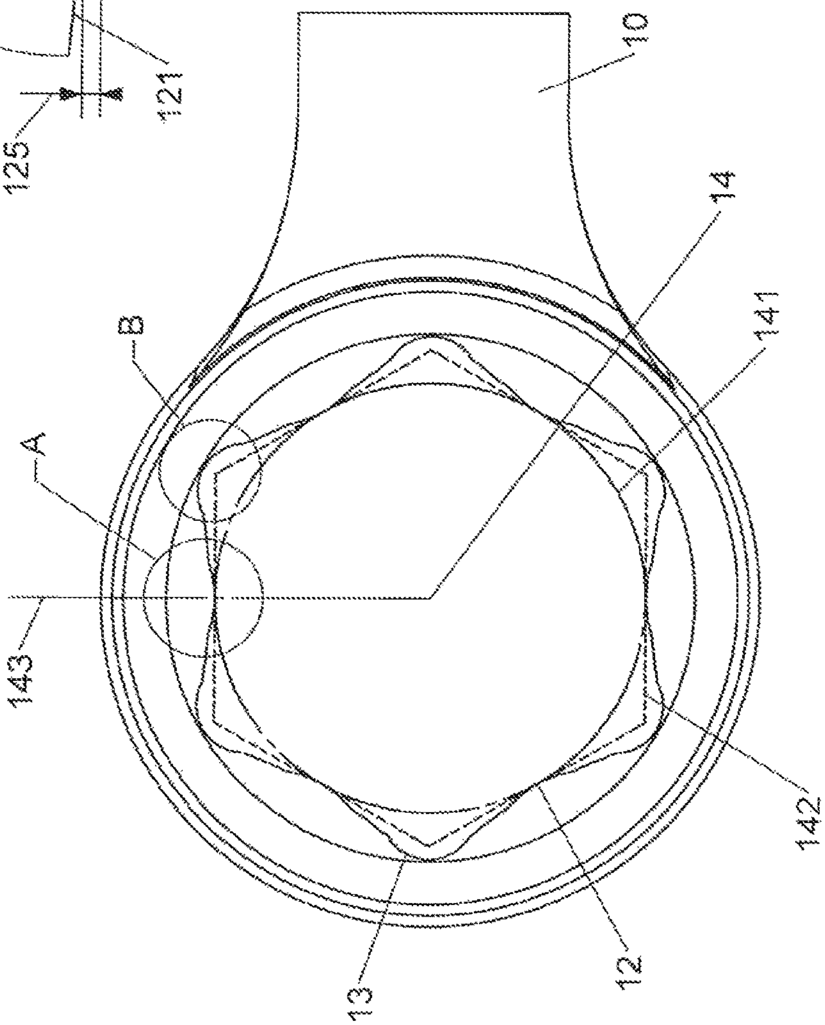
FIG. 12 is a front view of an engaging structure for a hand tool in accordance with the seventh preferred embodiment of the present invention.

Referring to FIGS. 12-14, each of the six receiving portions 13 has an arcuate concave shape. Each of the six receiving portions 13 is arranged between one of the two first arcuate faces 121 of one of the six drive portions 12 and one of the two first arcuate faces 121 of another one of the six drive portions 12. Each of the six receiving portions 13 has an interior forming a first circle 131. The first circle 131 is tangent to each of the two first arcuate faces 121. Each of the six receiving portions 13 is not tangent to each of the two first arcuate faces 121. Each of the six receiving portions 13 has a radius slightly more than that of the first circle 131. Each of the six receiving portions 13 and the first circle 131 have the same center of circle. Each of the six receiving portions 13 is a single arc.

In another preferred embodiment of the present invention, a chamfered structure is defined in a connection of each of the six receiving portions 13 and one of the two first arcuate faces 121. Thus, each of the six receiving portions 13 is connected to one of the two first arcuate faces 121 smoothly.

Accordingly, the engaging structure for a hand tool has the following advantages.

1. Each of the six drive portions 12 includes two first arcuate faces 121 and a second arcuate face 122. The second arcuate face 122 slightly protrudes from each of the two first arcuate faces 121, so that the first distance 125 is defined between the second arcuate face 122 and each of the two first arcuate faces 121. When the main body 10 is rotated to drive the screw member 20, the second arcuate face 122 of each of the six drive portions 12 rests on each of the six sides of the screw member 20, so that one of the two first arcuate faces 121 does not rest on one of the six sides of the screw member 20, and the other one of the two first arcuate faces 121 is also spaced from one of the six sides of the screw member 20. At this time, the six corners of the screw member 20 are received in the six receiving portions 13 respectively, to prevent the six corners of the screw member 20 from being worn by the six receiving portions 13.

2. The second arcuate face 122 slightly protrudes from each of the two first arcuate faces 121, so that the first distance 125 is less than 0.5 mm. Thus, the diameter of the main body 10 is slightly increased by provision of the second arcuate face 122.

3. Each of the six receiving portions 13 has an arcuate concave shape. Each of the six receiving portions 13 is arranged between one of the two first arcuate faces 121 of one of the six drive portions 12 and one of the two first arcuate faces 121 of another one of the six drive portions 12. Each of the six receiving portions 13 has an interior forming a first circle 131. The first circle 131 is not tangent to each of the two first arcuate faces 121. When the main body 10 is rotated to drive the screw member 20, the six corners of the screw member 20 are received in the six receiving portions 13 respectively, to prevent the six corners of the screw member 20 from being worn by the six receiving portions 13.

4. Each of the six receiving portions 13 has the first circle 131. Each of the six angled corners 147 of the second hexagon 146 is situated at a center of the first circle 131 of one of the six receiving portions 13. The six circular corners of the star-shaped screw member 30 are received in the six receiving portions 13 respectively. Thus, the mounting element 11 of the main body 10 is used to drive the star-shaped screw member 30 exactly.

5. The principle of the present invention is in that, the second arcuate face 122 slightly protrudes from each of the two first arcuate faces 121, so that the first distance 125 is defined between the second arcuate face 122 and each of the two first arcuate faces 121. The mounting element 11 is provided with the six receiving portions 13. Each of the six receiving portions 13 has the first circle 131 which is not tangent to each of the two first arcuate faces 121. The second arcuate face 122 is convex slightly, and each of the six receiving portions 13 is concave slightly. Thus, the mounting element 11 will not wear the six corners of the screw member 20 easily by provision of the second arcuate face 122 and each of the six receiving portions 13. The first distance 125 is less than 0.5 mm so that the outer diameter of the main body 10 is slightly increased by provision of the second arcuate face 122. Thus, the outer diameter of the main body 10 and the mounting element 11 will not wear the six corners of the screw member 20. In addition, each of the six angled corners 147 of the second hexagon 146 is situated at a center of the first circle 131 of one of the six receiving portions 13 so that the six circular corners of the star-shaped screw member 30 are received in the six receiving portions 13 respectively. Thus, the mounting element 11 of the main body 10 is used to drive the star-shaped screw member 30 exactly.

6. The second arcuate face 122 has a convex shape and will not cause a serrated or biting mark on the screw member 20.

7. Referring to FIG. 5 with reference to FIGS. 1 and 2, the screw member 20 is worn out and chamfered. When the main body 10 is rotated counterclockwise to drive the screw member 20, the second arcuate face 122 of each of the six drive portions 12 still rests on each of the six sides of the screw member 20. Thus, the main body 10 is able to operate the screw member 20 even when the screw member 20 is worn out or chamfered.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. An engaging structure for a hand tool, comprising:
a main body;
wherein:
the main body is provided with a mounting element;
the mounting element includes six drive portions and six receiving portions;
the six drive portions and the six receiving portions are arranged alternately and annularly;
each of the six drive portions has an arcuate convex shape;
each of the six drive portions includes two first arcuate faces and a second arcuate face;
the second arcuate face is situated at a center of each of the six drive portions;
the second arcuate face is located between the two first arcuate faces;
the second arcuate face is more projected than each of the two first arcuate faces;
the two first arcuate faces are spaced by the second arcuate face;
each of the two first arcuate faces has a first radius;
the second arcuate face has a second radius;
the first radius is more than the second radius;
the ratio between the first radius and the second radius is more than two;

each of the two first arcuate faces is tangent to a first horizontal line;
the second arcuate face is tangent to a second horizontal line;
a first distance is defined between the first horizontal line and the second horizontal line;
the first distance is less than 0.7 mm;
a second distance is defined between two ends of the second arcuate face;
each of the six receiving portions has an arcuate concave shape;
each of the six receiving portions is arranged between one of the two first arcuate faces of one of the six drive portions and one of the two first arcuate faces of another one of the six drive portions;
each of the six receiving portions forms a first circle;
the first circle is not tangent to each of the two first arcuate faces;
the first circle has a third radius;
the third radius is less than the first radius;
the third radius is less than the second radius;
each of the six receiving portions is a single arc;
the mounting element has a center;
the center forms a second circle;
the second circle forms a first hexagon having six sides;
the second arcuate face of each of the six drive portions is tangent to one of the six sides of the first hexagon of the second circle;
the center is provided with a vertical line;
the vertical line passes through the most protruding position of the second arcuate face;
the vertical line passes through a center of each of the two first arcuate faces and a center of the second arcuate face;
a third distance is defined between any two opposite sides of the first hexagon;
each of the six sides of the first hexagon has a length defining a fourth distance;
the fourth distance is three times to five times of the second distance;
the fourth distance is optimally 3.7 times to 4.3 times of the second distance;
the center is served as an axis defining a second hexagon;
the second hexagon is less than the first hexagon;
the second hexagon has six sides parallel with the six sides of the first hexagon;
the second hexagon has six angled corners;
each of the six angled corners is situated at a center of the first circle of one of the six receiving portions; and
each of the six angled corners is served as a center of the third radius.

2. The engaging structure as claimed in claim 1, wherein the main body is a box end wrench or an engaging member of a hand tool.

3. The engaging structure as claimed in claim 1, wherein the main body is a ratchet wheel structure pivotally mounted on a ratchet wrench.

4. The engaging structure as claimed in claim 1, wherein the main body is a socket structure.

5. The engaging structure as claimed in claim 1, wherein the main body is a sliding rod structure, a float connector, or a universal connector.

6. The engaging structure as claimed in claim 1, wherein the main body is an open end wrench structure or a pipe wrench structure.

7. The engaging structure as claimed in claim 1, wherein:
each of the six receiving portions has an arcuate concave shape;
each of the six receiving portions is arranged between one of the two first arcuate faces of one of the six drive portions and one of the two first arcuate faces of another one of the six drive portions;
each of the six receiving portions has an interior forming a first circle;
the first circle is tangent to each of the two first arcuate faces;
each of the six receiving portions is not tangent to each of the two first arcuate faces;
each of the six receiving portions has a radius slightly more than that of the first circle;
each of the six receiving portions and the first circle have the same center of circle; and
each of the six receiving portions is a single arc.

* * * * *